United States Patent Office 3,135,729
Patented June 2, 1964

3,135,729
PROCESS FOR PREPARING SALTS OF HYDRO-
CARBON-PHOSPHORUS SULFIDE REACTION
PRODUCTS
Herman D. Kluge, Fishkill, and Roger G. Lacoste, Hope-
well Junction, N.Y., assignors to Texaco Inc., New
York, N.Y., a corporation of Delaware
No Drawing. Filed Sept. 23, 1959, Ser. No. 841,668
9 Claims. (Cl. 260—139)

This invention relates to a process for preparing alkaline earth metal salts of hydrocarbon thiophosphonic acids. More particularly, this invention involves an improved process for producing mineral lubricating oil concentrates of alkenethiophosphonic acids useful in the formulation of premium motor oils.

Alkaline earth metal salts of phosphorus sulfidehydrocarbon reaction products are known to be effective additives for lubricants employed in internal combustion engines. The use of neutralized phosphorus sulfide-hydrocarbon reaction products as components of lubricant compositions is disclosed in U.S. Patents 2,316,080 and 2,316,082. The subject invention is directed to an improved process for preparing alkline earth metal salts of hydrocarbon-phosphorus sulfide reaction products.

In accordance with the process of this invention a mineral oil concentrate of a phosphorus sulfide-hydrocarbon reaction product is hydrolyzed to form a hydrocarbon thiophosphonic acid and inorganic phosphorus acids after which the concentrate of the hydrolyzed reaction product is dried and extracted with anhydrous methanol to form an extract phase containing inorganic phosphorus acids and a raffinate phase containing the hydrocarbon thiophosphonic acids. After separation of the extract phase, the raffinate is reacted with a basic alkaline earth inorganic compound in the presence of anhydrous methanol to form a salt of the hydrocarbon thiophosphonic acid. The anhydrous methanol is removed from the salt-containing mineral oil concentrate, water is added and the aqueous concentrate heated under reflux. The mineral oil concentrate of the alkaline earth metal hydrocarbon thiophosphonic acid salt is then dried. During the elevated temperature drying carbon dioxide is advantageously passed through the mineral oil concentrate to convert excess inorganic compounds to carbonates.

The advantages of the process of the invention over prior art methods for manufacturing alkaline earth metal salts of hydrocarbon thiophosphonic acid are significant and substantially improve both the economics and the quality of the additives.

The first advantage flows from the use of the same solvent for both removal of inorganic phosphorus acids from the hydrolyzed hydrocarbon-phosphorus sulfide reaction product and for the reaction of the mineral oil solution of hydrocarbon thiophosphonic acid with the basic alkaline earth metal inorganic compound. Prior art processes for effecting removal of inorganic phosphorus acids from the hydrolyzed hydrocarbon-phosphorus sulfide reaction product have involved either the use of solid adsorbents such as disclosed in the commonly assigned copending applications Serial No. 750,874 filed July 25, 1958, now U.S. 2,987,512 and Serial No. 763,812 filed September 29, 1958, now U.S. 2,951,835, or the use of mixtures of water and $C_1$ to $C_5$ aliphatic alcohol or phenol as disclosed in U.S. 2,843,579. The use of the solid adsorbents requires the use of solids handling equipment whereas the extraction with aqueous mixtures has the disadvantage of necessitating a drying and/or solvent removal step prior to further processing of the hydrocarbon thiophosphonic acids formed in the hydrolysis. Both of these disadvantages are eliminated by the single solvent process of the present invention.

The process of the present invention also results in higher yields of the desired alkaline earth metal salts of the hydrocarbon thiophosphonic acids than are obtained by prior art processes wherein the inorganic phosphorus acids are removed from the hydrolyzed reaction product by procedures such as solid adsorbent treating. Not only are higher yields of the desired alkaline earth metal salts obtained, but a better quality product is obtained because more complete removal of inorganic acids from the hydrolyzed reaction product is obtained by the anhydrous methanol process of the instant invention.

Another advantage of the process of the invention is that the mineral lubricating oil concentrates of the alkaline earth metal salts of hydrocarbon thiophosphonic acids produced by the process of the invention are substantially less viscous than the mineral oil concentrates produced by the prior art processes. Apparently, the neutralization sequence involving reaction of the hydrocarbon thiophosphonic acid with basic alkaline earth metal inorganic compound in anhydrous methanol, removal of methanol, water addition and drying with $CO_2$ blowing produces a more fluid mineral oil concentrate of the alkaline earth metal salt of the hydrocarbon thiophosphonic acid. The addition of water subsequent to the methanol removal hydrolyzes alkaline earth metal methylate which is formed during the neutralization and which imparts gel-forming tendencies to the mineral oil concentrate of the hydrocarbon thiophosphonic acid salt.

Although the hydrocarbon reacted with the phosphorus sulfide can be an aromatic hydrocarbon, a cycloaliphatic hydrocarbon or an aliphatic hydrocarbon, olefins are almost generally employed as the hydrocarbon reactant. The olefinic hydrocarbons reacted with phosphorus sulfides usually contain at least 12 carbon atoms although lower molecular weight olefins can be employed. Monoolefin polymers such as isobutylene polymer, butylene polymer, propylene polymer, and copolymers of monoolefins such as propylene-isobutylene copolymer are particularly preferred materials for reaction with phosphorus sulfides. In general, monoolefin polymers and copolymers having an average molecular weight between about 400 and 5000 are employed as the hydrocarbon reactant with polymers and copolymers having an average molecular weight in the range of about 600 to 2000 being particularly preferred. Copolymers of conjugated dienes and monoolefins such as a copolymer of butadiene and isobutylene having an average molecular weight in the above-prescribed range also react with phosphorus sulfides to give lubricant additives.

Olefins useful for reaction with phosphorus sulfides can also be prepared by halogenation of high molecular weight hydrocarbon fractions and subsequent dehydrohalogenation. Olefin fractions obtained by cracking of high molecular weight hydrocarbon fractions may also be used as the hydrocarbon reactant.

Although phosphorus sulfide such as $P_2S_5$, $P_4S_7$ and $P_4S_3$ may be used as the phosphorus sulfide reactant, phosphorus pentasulfide, $P_2S_5$, is used in substantially all commercial preparations because of its availability and cost. In subsequent description, $P_2S_5$ will be used to illustrate the invention.

The reaction between an olefin and $P_2S_5$ is effected at a temperature between 200 and 500° F. in a non-oxidizing atmosphere, for example, in a blanket of nitrogen. The $P_2S_5$ reagent is employed in an amount between about 5 and 40 weight percent of the olefin. On a molar basis the olefin and $P_2S_5$ are usually present in amounts between 1 and 3 mols of hydrocarbon per mol of $P_2S_5$. The preferred mol ratio lies in the range of 1 to 2 mols of hydrocarbon per mol of $P_2S_5$. The reaction of the olefin-$P_2S_5$ is normally effected in the presence of a small amount of sulfur equivalent to between about 0.1 and 1.0 weight percent of the olefin reactant.

Subsequent to the reaction of the olefin and $P_2S_5$, the reaction product is usually diluted with a mineral oil since the remaining steps of the process are advantageously effected therein. A mineral lubricating oil having an SUS viscosity at 100° F. between about 50 and 200 is usually employed as diluent with a paraffin base distillate having an SUS at 100° F. of about 100 being preferred. The amount of diluent mineral lubricating oil employed is in no manner critical to the process of the reaction but generally is about equivalent to the weight of the olefin reactant.

Hydrolysis of the olefin-$P_2S_5$ reaction product is effected by contact with steam at a temperature between about 200 and 500° F. Steam treatment under these conditions hydrolyzes the olefin-$P_2S_5$ reaction product to inorganic phosphorus acids and an organic phosphorus and sulfur-containing acidic reaction product which is an alkenethiophosphonic acid having the general formula:

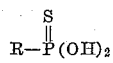

wherein R is the charge olefin radical.

The mineral oil concentrate of hydrolyzed olefin-$P_2S_5$ product is dried prior to anhydrous methanol extraction by maintaining the concentrate at the same temperature as employed for the steam hydrolysis, that is, between about 200 and 500° F., while passing therethrough an inert gas such as nitrogen.

The inorganic phosphorus acids formed during hydrolysis of the $P_2S_5$-olefin reaction product are separated therefrom by extraction with anhydrous methanol at a temperature between 50 and 110° F. and advantageously at atmospheric pressure. Higher temperatures may be used if higher pressures are used but no advantage is thereby obtained. The anhydous methanol solvent is employed in an amount between 0.5 to 3.0 volumes of methanol per volume of the mineral oil concentrate of the hydrolyzed olefin-$P_2S_5$ reaction product. The usual dosage of methanol is an equal volume to that of the concentrate of hydrolyzed olefin-$P_2S_5$ product. Treatment of the hydrolyzed olefin-$P_2S_5$ reaction product with anhydrous methanol results in the formation of an extract phase containing the inorganic phosphorus acids and a raffinate phase containing the alkenethiophosphonic acid.

Various techniques can be employed for the extraction of the mineral oil concentrate of hydrolyzed olefin-$P_2S_5$ reaction product. Continuous counter-current extraction in a tower, batch extraction employing mixing devices and more complicated devices such as Stratco contactors and Podbielniak extractors, can be employed for the extraction. It has been found particularly advantageous to effect contact of the methanol with the mineral oil concentrate by passing the methanol-mineral oil concentrate through a gear pump which effects excellent contacting between the solvent and the mineral lubricating oil concentrate. Separation of the methanol extract phase from the raffinate phase is effected by passage through a centrifuge or by settling.

The raffinate phase comprises alkenethiophosphonic acids containing a small concentration of anhydrous methanol solvent. Since the subsequent neutralization step is effected in a methanol solvent medium, there is no need to remove the residual solvent prior to the neutralization step.

The alkenethiophosphonic acid is neutralized with a basic alkaline earth metal inorganic compound which is usually an alkaline earth metal oxide, hydroxide or carbonate. The preferred basic inorganic compounds used in the neutralization are hydroxides and oxides, specifically, barium oxide, barium hydroxide, calcium oxide and calcium hydroxide. The alkaline earth metal inorganic compound is employed in an amount between 1 and 2 mols per mol of alkenethiophosphonic acid. The use of 1 mol of alkaline earth metal inorganic compound per mol of alkenethiophosphonic acid produces a neutral salt, whereas the use of between 1 and 2 mols of inorganic compound per mol of alkenethiophosphonic acid results in the formation of basic salts.

The neutralization reaction mixture is formed by adding to the mineral lubricating oil concentrate of alkenethiophosphonic acid 1 to 2 mols of basic alkaline earth metal inorganic compound and 5–20 mols of anhydrous methanol per mol of alkenethiophosphonic acid. The preferred concentration of anhydrous methanol in the neutralization reaction mixture falls between 10 and 15 mols per mol of alkenethiophosphonic acid. The neutralization of the alkenethiophosphonic acid with basic inorganic compound in the anhydrous methanol reaction medium is effected at ambient temperature and is advantageously accompanied by $CO_2$ blowing of the neutralization mixture. In addition to providing the desired agitation, $CO_2$ blowing also accelerates the reaction of the alkenethiophosphonic acid with the basic alkaline earth metal inorganic compound through the intermediate formation of a complex alkaline earth metal methoxy carbonate.

After reaction in the anhydrous methanol medium at ambient temperature for a period of 0.5 to 2 hours and normally for 1 hour, the methanol solvent is removed by heating the neutralization mixture to a temperature between about 150 and 250° F. and preferably between about 170 and 200° F. After removal of the methanol, water is added thereto in an amount equivalent to 2–8 mols of water per mol of alkenethiophosphonic acid. The addition of water hydrolyzes the complex methoxy alkaline earth metal carbonate which accelerates the neutralization of the alkenethiophosphonic acid. The addition of water at this point substantially reduces the gel-forming tendencies of mineral oil concentrate of alkenethiophosphonic acid salt. The preferred concentration of water for hydrolysis of the complex alkaline earth metal methoxy salt and producing a more fluid product is 3–6 mols of water per mol of alkenethiophosphonic acid. The reaction mixture is heated under reflux in the presence of the added prescribed amount of water for a short period of time between about ¼ and 1 hour and usually for about ½ hour.

The mineral oil concentrate of the alkenethiophosphonic acid salt is then dried by raising the temperature to about 225° F. and preferably above 240° F. $CO_2$ is advantageously blown through the concentrate during the drying operation to expedite the removal of water and to convert excess alkaline earth metal oxide or hydroxide to the carbonate salt.

Nitrogen can replace all or part of the $CO_2$ employed during the drying of the mineral lubricating oil concentrate of the alkenethiophosphonic acid salt. If nitrogen completely replaces the $CO_2$, the excess alkaline earth metal compound is dispersed in the form of hydroxide or oxide rather than the neutral carbonate.

The process of the invention is illustrated in the following examples:

*Example 1.*—A polybutylene-$P_2S_5$ reaction product was prepared by reacting polybutylene having an average molecular weight of about 780 with $P_2S_5$ in a ratio of 1.25 mols of polybutylene per mol of $P_2S_5$ in the presence of sulfur in an amount equal to 0.5 weight percent of polybutylene. The reaction was effected at 450° F. over a four-hour period in a nitrogen atmosphere. The reaction product was diluted with a paraffin base distillate having an SUS at 100° F. of about 100 in an amount equivalent to 1.39 times the weight of the polyolefin reactant. The lubricating oil concentrate was steamed at 375° F. for four hours in a nitrogen atmosphere and then dried by passing nitrogen therethrough at the same temperature. The hydrolyzed product having a Neut. No. of 76.3 was extracted with an equal volume of methyl alcohol at 75° F. and then centrifuged to give a methanol extract containing inorganic phosphorus acids and a lubricating oil raffinate containing the olefin-$P_2S_5$ product and having a Neut. No. of 28.8.

To the lubricating oil concentrate containing 1 mol of alkenethiophosphonic acid, there was added 1.57 mols of barium oxide and 12.0 mols of methyl alcohol. The resulting mixture was then blown with $CO_2$ at ambient temperature for one hour after which the methyl alcohol solvent was removed by increasing the temperature from 190 to 200° F. After removal of the methyl alcohol, 4.7 mols of water were carefully added and the reaction mixture refluxed for ½ hour. The temperature was then raised to 250° F. with $CO_2$ blowing which was continued for one hour. Filtration gave a product which had a kinematic viscosity at 210° F. of 265.8 cs. Analysis of the product showed that it contained 7.39% barium against the theoretical barium content of 8.37% indicative of a barium conversion of 88.4%.

In contrast, Example 2 demonstrates the poorer utilization of alkaline earth metal inorganic compounds and the higher viscosity of the salt concentrate formed by a procedure similar to that employed in Example 1 with the exception that the inorganic phosphorus acids formed during hydrolysis of the olefin-$P_2S_5$ product were removed by contact with a solid adsorbent rather than by anhydrous methanol extraction as in the process of the invention.

*Example 2.*—A polybutylene-$P_2S_5$ reaction product was prepared by reacting polybutylene having an average molecular weight of about 780 with $P_2S_5$ in a ratio of 1.25 mols of olefin per mol of $P_2S_5$ in the presence of sulfur in an amount equal to 0.5 weight percent of polybutylene and at a temperature of 450° F. for 4 hours in a nitrogen atmosphere. The reaction product was then diluted with a paraffin base distillate having an SUS viscosity at 100° F. of about 100 in an amount equivalent to 1.69 times the weight of the polyolefin reactant. The lubricating oil concentrate of the olefin-$P_2S_5$ reaction product was steamed at 375° F. for 4 hours in a nitrogen atmosphere and then dried by passing nitrogen therethrough. The hydrolyzed product, which had a Neut. No. of 56.3, was treated with synthetic hydrous calcium silicate in an amount equivalent to about 108 weight percent of the $P_2S_5$ reactant at a temperature of 300° F. The mixture of concentrate and adsorbent was stirred for one hour in a nitrogen atmosphere and then was filtered to give a clear concentrate having a Neut. No. of 18.2.

To one mol of alkenethiophosphonic acid thus produced, there were added 1.57 mols of barium oxide and 12.0 mols of methyl alcohol. The resulting mixture was then $CO_2$ blown at ambient temperature for one hour. The methyl alcohol solvent was then removed by increasing the temperature from 190 to 200° F. after which 4.7 mols of water were carefully added and the reaction mixture refluxed for ½ hour. The temperature was then raised to 350° F. with $CO_2$ blowing which was continued for one hour. The resulting product filtered slowly to give a product which was almost a gel and had a kinematic viscosity at 210° F. of 1402.0 cs. Analysis of the product showed that it contained 6.85% barium as contrasted with a theoretical barium content of 8.14%, indicating a barium conversion of 84%.

Obviously, many modifications and variations of the invention as hereinbefore set forth may be made without departing from the spirit and scope thereof and, therefore, only such limitations should be imposed as are indicated in the appended claims.

We claim:
1. A process for preparing alkaline earth metal salts of hydrocarbon thiophosphonic acids which comprises reacting a hydrocarbon with phosphorus sulfide, forming a mineral oil concentrate of the resulting reaction product, hydrolyzing with steam said reaction product to form inorganic phosphorus acids and a hydrocarbon thiophosphonic acid, drying said concentrate of said hydrolyzed reaction product, contacting said dried concentrate with 0.5 to 3.0 volumes of anhydrous methanol per volume of said concentrate to form an extract phase containing inorganic phosphorus acids and a raffinate phase containing said hydrocarbon thiophosphonic acid, reacting said raffinate phase with a basic alkaline earth metal inorganic compound in 5 to 20 mols of anhydrous methanol per mol of said hydrocarbon thiophosphonic acid to form a hydrocarbon thiophosphonic acid salt, removing methanol from the salt-forming reaction mixture, adding 2 to 8 mols of water per mol of said hydrocarbon thiophosphonic acid to said salt-forming reaction mixture and drying said reaction mixture to form a fluid concentrate of said hydrocarbon thiophosphonic acid salt.

2. A process for preparing alkaline earth metal salts of alkenethiophosphonic acids which comprises reacting an olefin containing at least 12 carbon atoms with $P_2S_5$, forming a mineral oil concentrate of the resulting reaction product, hydrolyzing with steam said reaction product to form inorganic phosphorus acids and an alkenethiophosphonic acid, drying said concentrate of said hydrolyzed reaction product, contacting said dried concentrate with 0.5 to 3.0 volumes of anhydrous methanol per volume of said concentrate to form an extract phase containing inorganic phosphorus acids and a raffinate phase containing alkenethiophosphonic acid, reacting said raffinate phase with a basic alkaline earth metal inorganic compound in 5 to 20 mols of anhydrous methanol per mol of said alkene thiophosphonic acid to form a salt of said alkenethiophosphonic acid, removing methanol from the salt-forming reaction mixture, adding 2 to 8 mols of water to said salt-forming reaction mixture, heating said water-containing reaction mixture, and drying said reaction mixture to form a fluid concentrate of said alkenethiophosphonic acid salt.

3. A process according to claim 2 in which hydrolysis of said olefin-$P_2S_5$ reaction product is effected by contact with steam at a temperature between 200 and 500° F.

4. A process according to claim 2 in which said concentrate of hydrolyzed olefin-$P_2S_5$ product is dried by passing an inert gas therethrough while temperature is maintained between 200 and 500° F.

5. A process according to claim 2 in which said raffinate phase is reacted with an alkaline earth metal inorganic compound in anhydrous methanol at ambient temperature.

6. A process according to claim 2 in which said raffinate phase is reacted with 1–2 mols of basic alkaline earth metal inorganic compound per mol of alkenethiophosphonic acid in said raffinate phase and in the presence of 10–15 mols of anhydrous methanol per mol of alkenethiophosphonic acid in said raffinate phase.

7. A process according to claim 2 in which $CO_2$ is blown through said raffinate phase during reaction with said alkaline earth metal inorganic compound in anhydrous methanol.

8. A process according to claim 2 in which carbon dioxide is blown through said salt-forming mixture during the drying step.

9. In a process for preparing mineral oil concentrates of alkaline earth metal hydrocarbon thiophosphonates by a process involving reaction of phosphorus sulfide with a hydrocarbon, dissolving said reaction product in a mineral oil to form a concentrate thereof, contacting said concentrate with steam to hydrolyze said reaction product to inorganic phosphorus acids and hydrocarbon thiophosphonic acid, extracting inorganic phosphorus acids from said concentrate and neutralizing the raffinate from said extraction with a basic alkaline earth metal inorganic compound to form a concentrate of an alkaline earth metal hydrocarbon thiophosphonate, the improvement of effecting removal of said inorganic phosphorus acids from the dried concentrate of inorganic phosphorus acids and hydrocarbon thiophosphonic acids by extraction with anhydrous methanol and subsequent neutralization of the raffinate from said extraction step in the presence of 5–20 mols of anhydrous methanol per mol of said hydrocarbon thiophosphonic acid, removing methanol from said neutralization reaction mixture, adding 2–8 mols of water per mol of said hydrocarbon thiophosphonic acid to said neutralization mixture and drying said mixture to form a fluid concentrate of said alkaline earth metal hydrocarbon thiophosphonate.

References Cited in the file of this patent

UNITED STATES PATENTS

| | | |
|---|---|---|
| 2,843,579 | Lemmon et al. | July 15, 1958 |
| 2,965,569 | Sabol | Dec. 20, 1960 |